United States Patent [19]

Morrill

[11] Patent Number: 4,827,166

[45] Date of Patent: May 2, 1989

[54] WATER-RESISTANT MOTOR

[76] Inventor: Wayne J. Morrill, King and Hamsher Sts., Garrett, Ind. 46738

[21] Appl. No.: 165,245

[22] Filed: Mar. 7, 1988

[51] Int. Cl.⁴ .............................................. H02K 5/10
[52] U.S. Cl. ...................................... 310/88; 310/62; 310/89; 277/56; 384/135
[58] Field of Search ............. 310/88, 85, 40 MM, 62, 310/63, 60 R, 89, 90, 91, 166, 56, 261; 384/135, 136, 465; 29/596; 277/35, 50, 53-57, 67-69

[56] References Cited

U.S. PATENT DOCUMENTS

| | | |
|---|---|---|
| 1,816,506 | 7/1931 | Wait ..................... 310/56 |
| 2,736,826 | 2/1956 | Hoover . |
| 2,769,105 | 10/1956 | Altschwager et al. . |
| 2,950,402 | 8/1960 | Glaza . |
| 3,512,024 | 5/1970 | Papa ..................... 310/88 |
| 3,885,176 | 5/1975 | Cunningham . |
| 4,132,912 | 1/1979 | Wright .................. 310/63 |
| 4,287,662 | 9/1981 | Otto . |
| 4,358,303 | 11/1982 | Rakow . |
| 4,535,262 | 8/1985 | Newburg . |

Primary Examiner—R. Skudy
Attorney, Agent, or Firm—Pearne, Gordon, McCoy & Granger

[57] ABSTRACT

A water-resistant fan motor has a water spray deflector which includes a closed central portion fan blade and a closed, convex, coaxial deflector between the fan blade and the motor housing. This convex deflector establishes a first small gap between the periphery of the rotatable convex deflector and a portion of the housing substantially at the outer diameter thereof. A second small gap between a portion of the rotor and a portion of the housing is unaligned with the first small gap and an enlarged cavity is in series between the first and second small gaps. This construction establishes a labyrinth for any water spray, and hence inhibits any water spray entering the interior of the motor housing. The foregoing abstract is merely a resume of one general application, is not a complete discussion of all principles of operation or applications and is not to be construed as a limitation on the scope of the claimed subject matter.

19 Claims, 1 Drawing Sheet

WATER-RESISTANT MOTOR

BACKGROUND OF THE INVENTION

Electric motors have previously been proposed with oil slinger discs rotating with the rotor shaft to cause oil in the bearing compartment to be retained in that bearing compartment, e.g., in U.S Pat. No. 3,885,176. A similar principle has been suggested in horizontal shaft motors, as in U.S. Pat. No. 2,950,402, with a rotating disc or outwardly concave cone to centrifugally sling contaminants to keep them from the interior of the motor. A similar construction has also been suggested for vertical shaft motors for drip-proof construction, as in dishwashers, as suggested in U.S. Pat. Nos. 4,287,662 and 4.535,262. A multi-apertured rotating slinger disc has also been suggested in U.S. Pat. No. 4,358,303 as a debris screen. Where a motor is to be operated in an explosive atmosphere, explosion-proof designs have been suggested wherein atmosphere can circulate through the motor but has to pass through a flame arrester of axially spaced, rotating radial plates to cool any explosive same, as in U.S. Pat. No. 2,736,826. Where a totally enclosed motor-is required, U.S. Pat. No. 2,769,105 suggests an air-to-air heat exchanger with a labyrinth seal to prevent interchange of interior to exterior air.

All of these prior solutions have been for fairly large motors, e.g., at least ¼ horsepower Where a subfractional horsepower fan motor is desired, e.g., 4 to 7 watts output and 7 to 10 watts input. this requires a high efficiency motor. Also, such motors may be required in environments which need to be hosed down, e.g., for ten minutes each day for sanitary reasons. If packings or gaskets are utilized around the motor shaft to keep out the entrance of such water splashing. the friction caused by such packings or gaskets is normally so high that the subfractional horsepower motor will fail to start.

SUMMARY OF THE INVENTION

The problem to be solved, therefore, is how to construct a small electric motor which is splash-proof yet has enough torque to accelerate from rest to normal running speed.

This problem is solved by a water-resistant fan motor comprising, in combination, an electric motor having a housing with an exterior and an interior, a rotor in the interior of said motor housing for rotation about an axis, water spray deflector means including a fan blade secured near a first axial end of said rotor, said deflector means having a coaxial deflector portion presenting a closed convex exterior surface on the first end of said motor, labyrinth means from the exterior to the interior of said housing, said labyrinth means including first and second small gaps between stationary and rotating parts of said fan motor, said deflector portion having an outer periphery lying closely adjacent a portion of said motor housing substantially at the outer diameter thereof to establish said first gap inhibiting entrance of any water spray to the interior of said housing. and said second small gap being unaligned with said first gap to further inhibit any water spray entering the interior of said housing.

Accordingly, an object of the invention is to provide a water spray deflector means in a water-resistant fan motor.

A feature of the invention is that a conical deflector which is outwardly convex is a part of a water deflector means in a fan motor, and the rotor is journaled in the motor with a gasketless construction to eliminate any friction of a gasket. The conical water deflector provides first and second small gaps between rotating and stationary parts of the motor, and these two small gaps are unaligned to inhibit any water spray reaching the interior of the motor housing.

Other objects and a fuller understanding of the invention may be had by referring to the following description and claims, taken in conjunction with the accompanying drawing.

DESCRIPTION OF THE PREFERRED EMBODIMENT

Figure 1:
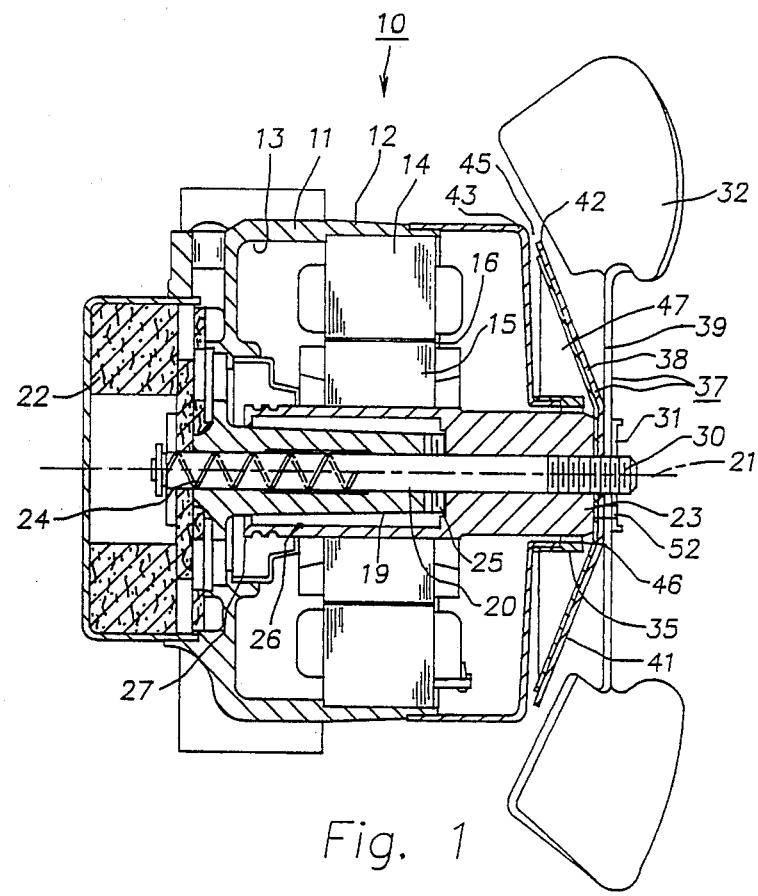
FIG. 1 is a longitudinal, sectional view of a motor incorporating the invention.
Figure 2:
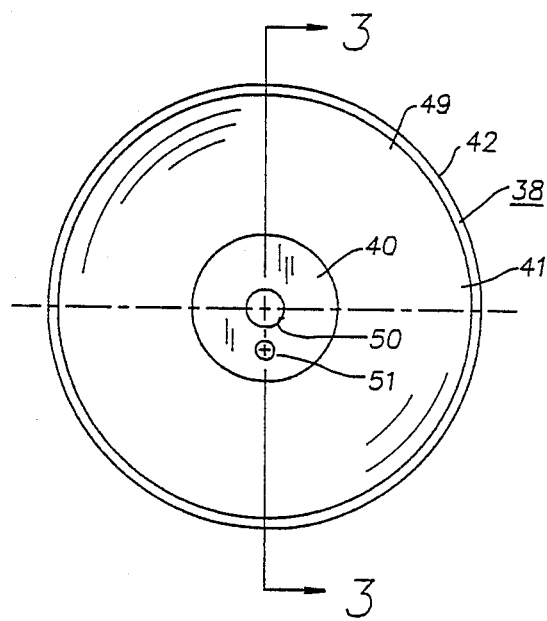
FIG. 2 is an elevational view of the water spray deflector means.

The drawing illustrates a water-resistant fan motor 10 which is mounted in a housing 11 having an exterior surface 12 and an interior surface 13. The fan motor 10 is an electric motor containing a stator 14 in the housing 11 and a rotor 15 cooperates with the stator through an air gap 16.

The housing 11 carries a unit bearing post 19 in which a rotor shaft 20 is rotatably journaled about an axis 21. A lubricant reservoir 22 is sealed in the housing 11, and provides oil lubrication for the shaft in the bearing post. The shaft 20 is fixed in a hub 23, and the rotor 15 is fixed on this hub Oil may move along the shaft 20 by means of a helical oil groove 24, and may pass out through thrust washers 25 to the inside surface 26 of the hub 23 and migrate toward the oil reservoir 22 and be returned thereto by an oil slinger disc 27.

A first end of the rotor has the rotor shaft extension 30 which is threaded to receive a nut 31. This nut holds in place a fan blade 32 on the end of the rotor hub 23. The rotor hub 23 is a coaxial projection substantially coextensive with a coaxial extension 35 of the housing 11.

Water spray deflector means 37 includes the fan blade 38 and a coaxial deflector portion 38 which presents a closed, convex, exterior surface on the first end of the motor 10. The fan blade 32 has a closed central portion 39 and the coaxial deflector portion 38 is preferably planar in a central portion and conical in an outer portion 41. The outer periphery 42 of the deflector portion 38 lies closely adjacent a portion 43 of the motor housing 11, which is generally at the outer diameter of the housing. This establishes a first small gap 45 between stationary and rotating parts of the fan motor 10. A second small gap 46 between stationary and rotating parts is established between the projection of the hub 23 and the housing extension 35. These gaps are small relative to an enlarged cavity 47. which is between these two gaps in a series path from the exterior to the interior of the housing 11. The first gap 45 is essentially an axial gap and the second gap 46 is essentially a radial gap. A water-absorbent liner, such as a paper. liner 49, is secured on the concave inner side of the deflector portion 38. The central portion 40 of the deflector portion 38 and the central portion 39 of the fan blade 32 are provided with coaxial apertures 50 to be received on the end of the shaft extension 30, and then this shaft, plus the nut 31, close this aperture, so that from the first end of the motor 10 the fan blade 32 presents a closed exterior surface.

The coaxial deflector portion also be provided with a drive aperture 51 to receive a drive pin 52 on the rotor hub 23. The fan blade 32 has a similar aperture so that the fan blade and the coaxial deflector portion 38 are rotatably driven by the rotor 15.

The first and second small gaps 45 and 46 between the stationary and rotating parts of the fan motor provide labyrinth means from the exterior to the interior of the housing. These two small gaps are in series, with the enlarged cavity 47 in series between them. Neither gap has any packing or gasket and, typically, such a packing gasket or stuffing box would be provided in the second gap 46. The present invention has particular use with low power motors, such as subfractional horsepower motors, up to about 1/10 horsepower. Above that horsepower rating, a motor should be able to have enough starting torque to overcome the frictional drag of a gasket in the second gap 46.

In many applications, small ventilation fans are provided in air conditioning and refrigeration equipment and the like, which may often be used in manufacturing and processing plants which require compliance with sanitary regulations. Such sanitary regulations often require thorough hosing down of the equipment with water, e.g., for 10 minutes once each day or week. Under such conditions, the electric motor 10 may be energized to rotate the fan blade 32, and the deflector means 37 has been found to quite effectively keep the water spray from the interior 13 of the housing 11. If water strikes from the rear or lubricant reservoir end of the motor. there is no opening for water. If water strikes from the first or fan end of the motor, again there is no opening because of the closed central portion 39 of the deflector means 37. If water is sprayed from the side, the great majority of it will strike the convex outer surface of the conical deflector portion 38, and this, together with the closed central portion 39 of the fan blade 32, provides a V-shaped diverter for the water spray. Further, the high speed rotation of this conical deflector portion 38 will throw off any water droplets by centrifugal force. If water spray is directed at just exactly the right angle and the right location, some water can enter the first small gap 45 and go into the enlarged cavity 47. However, .the first gap 45 is an axial gap and the second gap 46 is a radial gap; hence, they are unaligned, and a stream of water cannot go directly through these two small gaps in series. The water-absorbent liner 49 lies along a direct path between these two small gaps to slow down the water flow and absorb such direct spray or a ricocheting spray. Under certain conditions, it may be desirable to provide a drain aperture in the bottom of the housing 11 so that if any water should get to the interior of the housing, it can drain out without filling up the interior 13 of the housing 11. The electric motor 10 is preferably an induction motor, such as a capacitor run, single-phase induction motor, and hence there is no arc producing apparatus inside the housing. There are no brushes. slip rings, commutators, or centrifugal switches. Accordingly, the motor may be used in explosive or inflammable atmospheres which may permeate the interior of the housing without danger of explosion or fire.

The described construction inhibits entrance of any water sprayed through the first small gap 45 and the second small gap 46. even though there is no gasket in either of these two gaps. With the absence of a gasket, the friction of such a gasket is eliminated, and the only friction is the oil film lubrication at the journaled shaft 20. Thus, with motor outputs as small as four or five watts, the motor is capable of accelerating from a standing start to drive the fan blade at the normal running speed.

Figure 3:
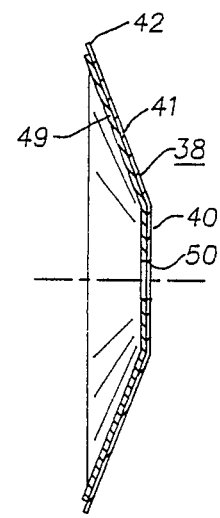
FIG. 3 is a sectional view on line 3—3 of FIG. 2.

In FIGS. 1 and 3, it will be noted that the coaxial deflector portion 38 has the central portion 40 which is in a plane normal to the axis 21, the outer periphery 42 of the deflector portion 38 lies in a second plane normal to the axis, and the two planes are axially displaced. This permits the deflector portion 38 to provide a convex, coaxial, exterior surface from the first end of the motor. This convex portion is preferably conical, at least in the outer portion 41 thereof, and this may be a cone in the order of 135 degrees included angle. This provides a good slinger action for centrifugal force displacement of any water spray.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A water-resistant fan motor comprising, in combination, an electric motor having a housing with an exterior and an interior;
   a rotor in the interior of said motor housing for rotation about an axis;
   water spray deflector means including a fan blade secured near a first axial end of said rotor;
   said deflector means having a coaxial deflector portion presenting a closed convex exterior surface on the first end of said motor;
   labyrinth means from the exterior to the interior of said housing;
   said labyrinth means including first and second small gaps between stationary and rotating parts of said fan motor;
   said deflector portion having an outer periphery lying closely adjacent a portion of said motor housing substantially at the outer diameter thereof to establish said first small gap inhibiting entrance of any water spray to the interior of said housing; and
   said second small gap being unaligned with said first small gap to further inhibit any water spray entering the interior of said housing.

2. A water-resistant fan motor as set forth in claim 1, including a rotatable shaft journaled in a bearing in said housing.

3. A water-resistant fan motor as set forth in claim 2, including a securement aperture in said fan blade; and securing means on said shaft securing said fan blade on said shaft and closing said securement aperture.

4. A water-resistant fan motor as set forth in claim 1, including one of said small gaps being substantially radial and the other being substantially axial.

5. A water-resistant fan motor as set forth in claim 1, including said convex exterior surface being substantially conical.

6. A water-resistant fan motor as set forth in claim 1, including said housing having a coaxial extension on the first end of said motor; and said convex coaxial deflector portion extending from said coaxial extension of said housing to substantially the outer diameter of said housing.

7. A water-resistant fan motor as set forth in claim 6, wherein said convex deflector portion has a central portion substantially normal to said axis and a conical outer peripheral portion.

8. A water-resistant fan motor as set forth in claim 7, wherein said conical portion has an included angle in the order of 135 degrees.

9. A water-resistant fan motor as set forth in claim 7, wherein said rotor has a coaxial projection substantially coextensive with said housing coaxial extension; and said deflector central portion being mounted agent the end of said rotor coaxial projection.

10. A water-resistant fan motor as set forth in claim 9, wherein said second small gap is a radial gap between said rotor projection and said housing coaxial extension.

11. A water-resistant fan motor as set forth in claim 10, wherein said first small gap is an axial gap between the periphery of said conical outer peripheral portion and said housing.

12. A water-resistant fan motor as set forth in claim 1, including a concave inner side of said coaxial deflector portion; and a water-absorbent liner on said concave inner side of said coaxial deflector portion.

13. A water-resistant fan motor as set forth in claim 1, wherein said coaxial deflector portion is separate from said fan blade.

14. A water-resistant fan motor as set forth in claim 1, including a water-absorbent material in the path between said first and second small gaps.

15. A water-resistant fan motor as set forth in claim 1, wherein said first and second small gaps are in series in a path of water spray entrance to the interior of said housing.

16. A water-resistant fan motor as set forth in claim 15, including an enlarged cavity in series between said first and second gaps and the exterior of said housing to further inhibit entrance of water spray to the interior of said housing.

17. A water-resistant fan motor as set forth in claim 1, including means attaching said deflector portion to said rotor at a first plane normal to said axis; and said deflector portion outer periphery lying in a second plane normal to said axis, which second plane is axially displaced from said first plane.

18. A water-resistant fan motor as set forth in claim 1, wherein said deflector portion is separate from said fan blade and defines therewith a V-shaped diverter for water spray.

19. A water-resistant fan motor as set forth in claim 1, including a gasketless clearance at each of said first and second small gaps to minimize friction of rotation of said rotor.

* * * * *

UNITED STATES PATENT AND TRADEMARK OFFICE
CERTIFICATE OF CORRECTION

PATENT NO.   : 4,827,166

DATED        : May 2, 1989

INVENTOR(S)  : Wayne J. Morrill

It is certified that error appears in the above-identified patent and that said Letters Patent is hereby corrected as shown below:

Col. 1, line 23 "same" should be --flame--.

Col. 2, line 34 after "hub" insert --.--.

Col. 2, line 46 "38" (first occurrence) should be --32--.

Col. 3, line 4 after "portion" should be added --38 may--.

Col. 5, line 18 "agent" should be --against--.

Signed and Sealed this

Thirtieth Day of January, 1990

*Attest:*

JEFFREY M. SAMUELS

*Attesting Officer*   *Acting Commissioner of Patents and Trademarks*